United States Patent
Murayama et al.

[11] Patent Number: 5,972,515
[45] Date of Patent: Oct. 26, 1999

[54] MAGNETIC RECORDING MEDIUM

[75] Inventors: Yuichiro Murayama; Masaki Satake; Hiroshi Hashimoto, all of Odawara, Japan

[73] Assignee: Fuji Photo Film Co., Ltd., Kanagawa, Japan

[*] Notice: This patent issued on a continued prosecution application filed under 37 CFR 1.53(d), and is subject to the twenty year patent term provisions of 35 U.S.C. 154(a)(2).

[21] Appl. No.: 08/852,287

[22] Filed: May 7, 1997

[30] Foreign Application Priority Data

May 13, 1996 [JP] Japan ..................................... 8-117402

[51] Int. Cl.$^6$ ..................................................... G11B 5/702
[52] U.S. Cl. ............................... 428/425.9; 428/694 BU; 428/694 BL; 428/694 BM; 428/694 BS; 428/900
[58] Field of Search .......................... 428/425.9, 694 BU, 428/694 BL, 694 BM, 694 BS, 900

[56] References Cited

U.S. PATENT DOCUMENTS 5,451,464  9/1995  Abe et al. ............................. 428/425.9
5,578,376  11/1996  Hashimoto et al. ................. 428/425.9
5,702,821  12/1997  Murayama et al. ................. 428/425.9

Primary Examiner—Stevan A. Resan
Attorney, Agent, or Firm—Sughrue, Mion, Zinn, Macpeak & Seas, PLLC

[57] ABSTRACT

The present invention provides a magnetic recording medium, which has high dispersion property, high breaking extension and excellent running durability. The magnetic recording medium comprises a magnetic layer having at least one layer of ferromagnetic powder and a binder, said magnetic layer being placed on a non-magnetic support member, whereby said binder contains at least a polyurethane resin (A) and a polyether polyester urethane resin (B), said polyurethane resin (A) contains a polyol with molecular weight of 500 to 5,000 by 0 to 50 weight %, said polyol being obtained by adding alkylene oxide to a diol having cyclic structure, said polyurethane resin (A) also contains a diol having cyclic structure and/or a short-chain diol with molecular weight of 200 to 500 by 15 to 50 weight %, said short-chain diol being obtained by adding alkylene oxide to diol, said polyurethane resin contains ether groups obtained from said diol and said polyol by 1.0 to 5.0 mmol/g to the total quantity of the polyurethane resin.

4 Claims, No Drawings

MAGNETIC RECORDING MEDIUM

BACKGROUND OF THE INVENTION

The present invention relates to a magnetic recording medium, having high electromagnetic transfer characteristics and durability and comprising one or more magnetic layers where ferromagnetic powder and a binder are dispersed, and said magnetic layers are placed on a non-magnetic support member.

The magnetic recording medium is widely used as recording tape, video tape or floppy disk. In the magnetic recording medium, a magnetic layer where ferromagnetic powder is dispersed in a binder is deposited on a non-magnetic support member.

The magnetic recording medium must be at high level in electromagnetic transfer characteristics, running durability and running performance. Specifically, in an audio tape for recording and reproducing musical sound, higher ability to reproduce the original sound is required. In a video tape, high ability to reproduce the original picture and excellent electromagnetic transfer characteristics are required.

In addition to the high electromagnetic transfer characteristics, the magnetic recording medium must have good running durability as described above. To provide good running durability, abrasive material and lubricant are added to the magnetic layer.

However, to have good running durability by adding an abrasive material, it is necessary to increase the adding quantity of the abrasive material to some extent, and this leads to the decrease of filling degree of the ferromagnetic powder. Also, in case the abrasive material having larger particle size is used to provide higher running durability, abrasive material may protrude excessively on the surface of the magnetic layer. Therefore, the improvement of running durability by the use of abrasive material causes problems such as deterioration of the electromagnetic transfer characteristics.

In case it is tried to improve the running durability by adding a lubricant, it is necessary to increase the adding quantity. This makes the binder more easily plasticizable and may decrease the durability of the magnetic layer.

In improving the durability and the electromagnetic transfer characteristics as described above, the binder, serving as one of major components of the magnetic layer, naturally plays an important role. Vinyl chloride resin, cellulose resin, urethane resin, acrylic resin, etc. as used in the past have caused problems such as deterioration of abrasion resistance of the magnetic layer or contamination of running members of the magnetic tape.

To solve the above problems, a method to use a harder binder and to increase hardness of the magnetic layer has been adopted, and it is proposed to produce a magnetic recording medium which uses a binder comprising a polyurethane resin with high hardness having an ether group-containing urethane of cyclic structure. For example, JP-A-1251416 describes a magnetic recording medium where a binder is used, which comprises a polyurethane resin containing polycarbonate structure by 5–50%. Also, JP-A-61148626 discloses a magnetic recording medium where a binder is used, which comprises a bisphenol type polyurethane resin containing polyol by 20 weight % or more. Further, JP-A-1267829 (U.S. Pat. No. 5,153,071) teaches a magnetic recording medium where a polyurethane is used, which contains a polyether polyol having cyclic structure.

The magnetic recording medium using these polyurethane resins as binder has high durability, while its dynamic strength at high temperature is not high. In particular, in an equipment used for high density recording, number of revolutions of magnetic head is high. The number of revolutions of the magnetic head is 9,600 rpm in a digital video tape recorder, 1,800 rpm in an analog video tape recorder for domestic use and 5,000 rpm for video tape recorder for business use. As a result, sliding speed between the magnetic recording medium and the magnetic head increases. Heat is generated due to sliding of the head where the tape is running at high speed, and magnetic coating film is fluidized, thereby leading to contamination of the head.

It has been proposed to increase heat resistance, moisture resistance, hydrolysis resistance, etc. by the use of a polyether polyester urethane resin. For example, JP-A-61104325 discloses a magnetic recording medium where a binder comprising a polyether polyester urethane resin is used, which contains a polyether polyol having an aromatic residual group. Also, JP-A-62121922 describes a magnetic recording medium where a binder comprising a urethane resin is used, which contains a polyether polyester polyol having aromatic hydrocarbon residual group. In the polyurethane described in JP-A-61104325, ethylene oxide, propylene oxide addition product, aromatic polybasic acid, etc. are used with PTMG (polytetramethylene glycol) and phenolic OH, and this has high heat resistance and hydrolysis resistance. Although there is no description on polyol content, it is about 55 weight % when calculated from the examples, and durability at high temperature is not sufficient. Because the content of ether group, serving as hydrophilic segment, is 7 mmol/g, it has low solubility in solvent, and dispersion property of the magnetic member is not satisfactory. The product disclosed by the latter patent has also similar problems.

JP-A-3201211 discloses a magnetic recording medium using a urethane resin, which contains a polyether block and a polyester block. PPG, PTMG, etc. are used as the polyether polyol, and PCL, butane diol adipate, etc. are used as polyester polyol, providing high hydrolysis resistance. However, the polyol content calculated from the examples is 60 weight % or more, and dynamic strength at high temperature is not sufficient.

In the magnetic layer using the polyurethane resins as given above, it is described that these are used alone or together with vinyl resin, but the disadvantage that the polyurethane resin has high strength but is fragile cannot be overcome.

To solve the above problems, it is an object of the present invention to provide a magnetic recording medium, which has high dispersion property and excellent electromagnetic transfer characteristics and also has coating film surface with high hardness at high temperature and superb durability at high temperature condition, and in particular, the invention provides a magnetic recording medium using a binder which contains a polyurethane having excellent properties.

SUMMARY OF THE INVENTION

The magnetic recording medium of the present invention comprises a magnetic layer having at least one layer of ferromagnetic powder and a binder, said magnetic layer being placed on a non-magnetic support member, whereby said binder contains at least a polyurethane resin (A) and a polyether polyester urethane resin (B), said polyurethane resin (A) contains a polyol with molecular weight of 500 to 5,000 by 0 to 50 weight %, said polyol being obtained by adding alkylene oxide to a diol having cyclic structure, said polyurethane resin (A) also contains a diol having cyclic structure and/or a short-chain diol with molecular weight of 200 to 500 by 15 to 50 weight %, said short-chain diol being obtained by adding alkylene oxide to diol, said polyurethane resin contains ether groups obtained from said diol and said polyol by 1.0 to 5.0 mmol/g to the total quantity of the polyurethane resin.

The present invention also provides a magnetic recording medium, which comprises a lower layer having non-magnetic powder or ferromagnetic powder and a binder, said lower layer being placed on a non-magnetic support member, and an upper layer having ferromagnetic powder and a binder, said upper layer being placed on said lower layer, whereby said binder in said upper layer and/or said lower layer contains at least a polyurethane resin (A) and a polyether polyester urethane resin (B), said polyurethane resin (A) contains a polyol with molecular weight of 500 to 5,000 by 0 to 50 weight %, said polyol being obtained by adding alkylene oxide to a diol having cyclic structure, said polyurethane resin (A) also contains a diol having cyclic structure and/or a short-chain diol with molecular weight of 200 to 500 by 15 to 50 weight %, said short-chain diol being obtained by adding alkylene oxide to diol, said polyurethane resin contains ether groups obtained from said diol and said polyol by 1.0 to 5.0 mmol/g to the total quantity of the polyurethane resin.

Also, the present invention provides a magnetic recording medium as described above, wherein a diol selected from the following diols is used as the diol having cyclic structure:

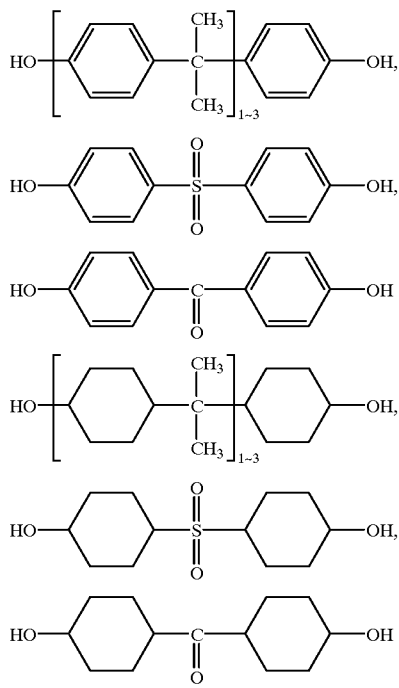

Also, the present invention provides a magnetic recording medium as described above, wherein the polyether polyester urethane resin (B) has glass transition temperature value (Tg) in the range from −85° C. to 0° C. and in the range from 40° C. to 200° C.

DESCRIPTION OF THE PREFERRED EMBODIMENTS

The magnetic recording medium of the present invention comprises a magnetic layer where ferromagnetic metal powder is dispersed in a binder, and it has been found that a magnetic layer having high strength, high extensibility and high toughness can be obtained by the use of a polyurethane resin with high hardness. By simultaneous use of a polyurethane resin with a polyether polyester urethane resin, it is possible to obtain a magnetic layer with high strength and high extensibility.

Simultaneous use of the polyurethane resin with vinyl chloride copolymer has been well known in the past, while the present inventors found that simultaneous use of a polyurethane resin with a polyether polyester urethane resin can provide a magnetic recording medium having a magnetic layer, having much higher strength than a magnetic layer, which has a binder where a polyurethane resin and a vinyl chloride copolymer are simultaneously used.

It is not exactly known why a magnetic layer with high strength and highly extensible can be obtained by simultaneous use of the polyurethane resin and the polyether polyester polyurethane resin of the present invention. It may be attributed to the fact that the polyurethane resin and the polyether polyester polyurethane resin have high compatibility to each other because the polyurethane resin of the present invention has a cyclic structure, has high Tg value and high strength, and also has an ether bond.

Here, the polyurethane resin in a binder used in the magnetic layer of the magnetic recording medium of the present invention, i.e. the polyurethane resin other than the polyether polyester polyurethane resin, is called a polyurethane resin (A), and the polyether polyester polyurethane resin is called a polyether polyester polyurethane resin (B) or a polyurethane resin (B).

It is preferable that the polyurethane resin (A) used in the present invention contains a short-chain diol by 20 to 40 weight %. If it is contained by less than 20 weight %, dynamic strength decreases and durability also decreases. If it is contained by more than 40 weight %, solubility in solvent decreases and dispersion property is reduced. Coating film is turned to fragile, and durability is reduced.

As the short-chain diol, bisphenol A, hydrogenated bisphenol A, bisphenol S, or bisphenol P, or polyethylene oxide or polypropylene oxide addition product of these substances, or polyethylene polypropylene mixture addition product may be used. More preferably, hydrogenated bisphenol A and ethylene oxide or propylene oxide addition product may be used.

Molecular weight (Mw) of the short-chain diol is preferably 100 to 400. If it is less than 100, coating film is turned to fragile and durability decreases. If it is more than 400, Tg of the coating film decreases and it is softened, resulting in lower durability.

The polyurethane resin (A) preferably contains polyol by 5 to 45 weight %, or more preferably by 15 to 40 weight %. If it is less than 5 weight %, solubility in solvent decreases, and dispersion property is reduced. If it is more than 45 weight %, strength of coating film decreases, thus leading to poor durability.

As the polyol, bisphenol A, hydrogenated bisphenol A, bisphenol S, or bisphenol P, or polyethylene oxide or polypropylene oxide addition product of these substances, or polyethylene polypropylene mixture addition product may be used. More preferably, bisphenol A, hydrogenated bisphenol A or ethylene oxide propylene oxide addition product may be used. Molecular weight (Mw) of the polyol is preferably 500 to 5,000. If it is more than 5,000, Tg value of the coating film decreases and it is softened, thus leading to poor durability.

Molecular weight (Mw) of the polyurethane resin (A) is preferably 30,000 to 70,000, or more preferably 40,000 to 60,000. If it is less than 30,000, strength of the coating film decreases, leading to poor durability. If it is more than 70,000, solubility in solvent decreases, and dispersion property is reduced.

The polyurethane resin (A) preferably contains 2 to 20 OH groups per molecule, or more preferably 3 to 15 OH groups per molecule. If it is contained by less than 3 per molecule, reactivity with isocyanate curing agent decreases. As a result, strength of coating film decreases, leading to poor durability. If it is contained by more than 15 per molecule, solubility in solvent decreases, and dispersion property is reduced.

Glass transition temperature (Tg) of the polyurethane resin (A) is preferably 50 to 200° C., or more preferably 80 to 150° C., or most preferably 100 to 130° C. If it is lower than 50° C., strength of coating film at high temperature decreases, thus leading to poor durability and lower preservation property. If it is higher than 200° C., calender workability decreases, leading to lower electromagnetic transfer characteristics.

The polyurethane resin (A) preferably contains a polar group. The polar group is preferably —$SO_3M$, —$OSO_3M$, —$PO_3M_2$, or —COOM (where M represents hydrogen, alkali metal, alkali earth metal, or ammonium salt), or more preferably —$SO_3M$, or —$OSO_3M$. The content of the polar group in the polyurethane resin is preferably $1\times10^{-5}$ to $2\times10^{-4}$ eq/g. If it is less than $1\times10^{-5}$, adsorption to the magnetic substance is not sufficient, and dispersion property decreases. If it is more than $2\times10^{-4}$, solubility in solvent decreases, and dispersion property is also decreased.

The polyurethane resin (B) simultaneously used with the polyurethane resin (A) is produced using a raw material containing a polyether polyol and a polyester polyol. As the polyether polyol, polypropylene glycol, polytetra-methylene glycol or bisphenol A added with at least one of propylene oxide or ethylene oxide, or a mixture of these substances may be selected. More preferably, polypropylene glycol and polytetramethylene glycol may be used. Molecular weight is preferably 500 to 5,000. If it is less than 500, ether group concentration decreases. As a result, compatibility with the polyurethane (A) decreases, thus leading to poor durability. If it is more than 5,000, strength of coating film at high temperature decreases, leading to poor durability.

As acid component in the polyester polyol, aromatic dicarboxylic acid such as terephthalic acid, isophthalic acid, orthophthalic acid, 1,5-naphthalic acid, etc. aromatic oxycarboxylic acid such as p-oxy-benzoic acid, p-(hydroxyethoxy)-ethoxy benzoic acid, etc. or aliphatic dicarboxylic acid such as succinic acid, adipic acid, azelaic acid, sebacic acid, dodecanedicarboxylic acid, etc. may be used.

As alcohol component of the polyester polyol, ethylene glycol, propylene glycol, 1,3-butanediol, 1,4-butanediol, 1,5-pentanediol, 1,6-hexanediol, neopentyl glycol, diethylene glycol, dipropylene glycol, 2,2,4-trimethyl-1,3-pentanediol, cyclohexanedimethanol, cyclohexanediol, bisphenol A or its ethylene oxide addition product and propylene oxide addition product, ethylene oxide addition product and propylene oxide addition product of hydrogenated bisphenol A, polyethylene glycol, polypropylene glycol, polytetramethylene glycol, etc. may be used.

Of these compounds, it is preferable to use a compound with cyclic structure or branched structure having high strength coating film at low temperature. As acid component, it is preferable to use isophthalic acid or terephthalic acid. As alcohol component, it is preferable to use neopentyl glycol, cyclohexanedimethanol, diethylene glycol, dipropylene glycol, or bisphenol A, hydrogenated bisphenol A and its ethylene oxide propylene oxide addition product.

Molecular weight of the polyester polyol is preferably 500 to 5,000. If it is less than 500, concentration of the urethane group increases, and solubility in solvent decreases, and this is not desirable. If it is more than 5,000, solubility of polyol in solvent decreases, and this results in difficulty to synthesize.

As the dynamic property, it is preferable that the polyurethane resin (B) has yield stress of 2 kg/mm$^2$ or more and breaking extension of 100% or more.

Glass transition temperature (Tg) of the polyurethane resin (B) is preferably from −85° C. to 0° C. in low temperature range, and from 40° C. to 200° C. in high temperature range, or more preferably from −50° C. to −5° C. in low temperature range, and from 70° C. to 150° C. in high temperature range. If Tg in low temperature range is lower than −85° C., the coating film becomes more viscous, and durability decreases. If Tg in low temperature range is higher than 0° C., toughness of the coating film decreases, leading to poor durability.

If Tg in high temperature range is lower than 40° C., coating film strength at high temperature decreases, and effect of durability is insufficient. If Tg in high temperature range is higher than 200° C., calender workability decreases, and smoothness of the coating film is impaired. Thus, electromagnetic transfer characteristics decrease.

In the binder of the magnetic recording medium of the present invention, it is preferable that the ratio of the polyurethane resin (A) to the polyurethane resin (B) is: (A)/(B)=3/7 to 7/3 in weight ratio. If the ratio of the polyurethane resin (A) is more than 7/3, the coating film becomes more fragile, and durability in repeated running is decreased. On the other hand, if the ratio of the polyurethane resin (A) is lower than 3/7, coating film strength at high temperature tends to decrease, and durability is lowered.

The polyurethane resin (A) and the polyurethane resin (B) are preferably added in kneading process or dispersion process of the coating solution, or more preferably in the kneading process. When added in the dispersion process, adsorption to the magnetic substance tends to be insufficient. As a result, dispersion property decreases, and coating film strength also decreases.

Organic diisocyanate may be contained in the binder of the present invention. As the organic diisocyanate compound, the following compounds may be used: aromatic diisocyanate such as 2,4-tolylene diisocyanate, 2,6-tolylene diisocyanate, xylene-1,4-diisocyanate, xylene-1,3-diisocyanate, 4-4'-diphenylmethane diisocyanate, 4,4-diphenylether diisocyanate, 2-nitrodiphenyl-4-4'-diisocyanate, 2,2'-diphenylpropane-4,4'-diisocyanate, 4-4'-diphenylpropane diisocyanate, m-phenylene diisocyanate, p-phenylene diisocyanate, naphthylene-1,4-diisocyanate, naphthylene-1,5-diisocyanate, 3,3'-dimethoxydiphenyl-4,4'-diisocyanate, etc., aliphatic diisocyanate such as lysine diisocyanate, cycloaliphatic diisocyanate such as isophorone diisocyanate, hydrogenated tolylene diisocyanate, hydrogenated diphenylmethane diisocyanate, etc.

The polyisocyanate compound contained in the magnetic layer is preferably contained in the binder by 10 to 50 weight %, or more preferably by 20 to 40 weight %.

When curing is performed by irradiation of electron beam, a compound having reactive double bond such as urethane acrylate may be used.

The weight of the total of the resin components and curing agent (i.e. weight of the binder) is preferably within the range of 15–40 weight parts to 100 weight parts of ferromagnetic powder, or more preferably within the range of 20–30 weight parts.

The ferromagnetic powder used in the magnetic recording medium of the present invention is powder of ferromagnetic iron oxide, cobalt-containing ferromagnetic iron oxide or ferromagnetic alloy having SBET specific surface area of 40 to 80 $m^2/g$, or more preferably 50 to 70 $m^2/g$. Crystallite size is preferably 12 to 25 nm, or more preferably 13 to 22 nm, or most preferably 14 to 20 nm. Longer axis length is preferably 0.05 to 0.25 $\mu$m, or more preferably 0.07 to 0.2 $\mu$m, or most preferably 0.08 to 0.15 $\mu$m. As the ferromagnetic metal powder, Fe, Ni, Fe—Co, Fe—Ni, Co—Ni, Co—Ni—Fe, etc. may be used. Within the range of 20 weight % or less of the metal components, an alloy containing the following elements may be used: aluminum, silicon, sulfur, scandium, titanium, vanadium, chromium, manganese, copper, zinc, yttrium, molybdenum, rhodium, palladium, gold, tin, antimony, boron, barium, tantalum, tungsten, rhenium, silver, lead, phosphorus, lanthanum, cerium, praseodymium, neodymium, tellurium, or bismuth. The ferromagnetic metal powder may contain small quantity of water, hydroxide or oxide. A method to produce the ferromagnetic powder is already known, and the ferromagnetic powder used in the present invention may be produced by the method already known.

There is no special restriction on the shape of the ferromagnetic powder. Normally, the powder having needle-like, granular, cubic, rice grain-like or planar shape may be used. In particular, it is preferable to use ferromagnetic powder of needle-like shape.

The resin component, the curing agent and the ferromagnetic powder as described above are kneaded and dispersed in a solvent such as methylethylketone, dioxane, cyclohexanone, ethyl acetate, etc. normally used in the preparation of a magnetic coating material, and a magnetic coating material is prepared. Kneading and dispersion may be performed by a normally practiced method.

The magnetic coating material may contain additives or filling agents normally used including abrasive material such as $\alpha$-$Al_2O_3$, $Cr_2O_3$, etc., antistatic agent such as carbon black, or lubricant, dispersant, etc. such as fatty acid, fatty acid ester, silicone oil, etc.

Next, description will be given on the lower non-magnetic layer or the lower magnetic layer in case the medium of the present invention has multi-layer arrangement. Inorganic powder used in the lower layer of the present invention may be magnetic powder or non-magnetic power. For example, in case of the non-magnetic powder, the powder may be selected from inorganic compound such as metal oxide, metal carbonate, metal sulfate, metal nitride, metal carbide, metal sulfide, etc. As the inorganic compound, the following substances may be used alone or in combination: $\alpha$-alumina having alpha ratio of 90 to 100%, $\beta$-alumina, $\gamma$-alumina, silicon carbide, chromium oxide, cerium oxide, $\alpha$-iron oxide, corundum, silicon nitride, titanium carbide, titanium oxide, silicon dioxide, tin oxide, magnesium oxide, tungsten oxide, zirconium oxide, boron nitride, zinc oxide, calcium carbonate, calcium sulfate, barium sulfate, molybdenum disulfide, etc. Titanium dioxide, zinc oxide, iron oxide or barium sulfate is preferably used, or more preferably titanium dioxide is used. Average particle size of the non-magnetic powder is preferably 0.005 to 2 $\mu$m. When necessary, non-magnetic powder having different average particle sizes may be combined, or non-magnetic powder may be used alone with wider particle size distribution to obtain the same effect. Above all, average particle size of the non-magnetic powder is preferably 0.01 to 0.2 $\mu$m. It is preferable that pH value of the non-magnetic powder is between 6–9. Specific surface area of the non-magnetic powder is preferably 1 to 100 $m^2/g$, or more preferably 5 to 50 $m^2/g$, or most preferably 7 to 40 $m^2/g$. Crystallite size of the non-magnetic powder is preferably 0.01 to 2 $\mu$m. Oil absorption using DBP is preferably 5 to 100 ml/100 g, or more preferably 10 to 80 ml/100 g, or most preferably 20 to 60 ml/100 g. Specific gravity is preferably 1 to 12, or more preferably 3 to 6. The shape may be needle-like, spherical, polyhedron, or planar shape.

It is preferable that surface treatment is performed on the surface of the non-magnetic powder with $Al_2O_3$, $SiO_2$, $TiO_2$, $ZrO_2$, $SnO_2$, $Sb_2O_3$, or ZnO. $Al_2O_3$, $SiO_2$, $TiO_2$ or $ZrO_2$ is preferably used to have better dispersion property, or more preferably, $Al_2O_3$, $SiO_2$, or $ZrO_2$ is used. These may be used in combination or alone. Depending upon the purpose, coprecipitated surface treatment layer may be used, or a method to treat with alumina and then to treat with silica, or a method with reverse procedure may be adopted. The surface treatment layer may be made as porous layer, while it is generally preferable to have a homogeneous and dense layer.

By mixing carbon black in the lower layer, it is possible to decrease the value of Rs, which is an effect already known, and to obtain micro Vickers hardness as desired. For this purpose, furnace black for rubber, thermal black for rubber, carbon black for color, acetylene black, etc. may be used.

Specific surface area of the carbon black is preferably 100 to 500 $m^2/g$, or more preferably 150 to 400 $m^2/g$. DBP oil absorption is preferably 20 to 400 ml/100 g, or more preferably 30 to 200 ml/100 g. Average particle size of the carbon black is 5 to 80 nm, or more preferably 10 to 50 nm, or most preferably 10 to 40 nm. It is preferable that pH value of carbon black is 2 to 10, moisture content is 0.1 to 10%, and tap density is 0.1 to 1 g/ml. Concrete examples of carbon black to be used in the present invention are as follows: BLACKPEARLS 2000, 1300, 1000, 900, 800, 880, 700, VULCAN XC-72 (manufactured by Cabot), #3050B, #3150B, #3250B, #3750B, #3950B, #950, #650B, #970B, #850B, MA-600 (manufactured by Mitsubishi Chemical Industries, Ltd.), CONDUCTEX SC, RAVEN 8800, 8000, 7000, 5750, 5250, 3500, 2100, 2000, 1800, 1500, 1255, 1250 (manufactured by Columbian Carbon Co., Ltd.), Ketchen Black EC (manufactured by Akzo Co.).

Magnetic powder may be used in the lower layer of the medium of the present invention. As the magnetic powder, it is preferable to use an alloy having $\gamma$-$Fe_2O_3$, Co-modified $\gamma$-$Fe_2O_3$, and $\alpha$-Fe as major component, or $CrO_2$ may be used. In particular, it is preferable to use Co-modified $\gamma$-$Fe_2O_3$. The ferromagnetic powder to be used in the lower layer of the medium of the present invention has preferably the same composition and performance characteristics as those of the ferromagnetic powder used in the upper magnetic layer. However, performance characteristics may be varied between the upper and the lower layers depending upon the purpose. For example, to improve long wavelength recording characteristics, it is desirable to set Hc of the lower magnetic layer to a value lower than that of the upper magnetic layer. Also, it is effective to have Br of the lower magnetic layer to a value higher than that of the upper magnetic layer. In addition, it is possible to give is advantage by adopting the multiple layer arrangement as already known.

For the lower magnetic layer or the lower non-magnetic layer, the same binder, lubricant, dispersant, additive, solvent, dispersion method, etc. as those of the magnetic layer may be applied. In particular, the technique already known relating to quantity and type of the binder, and adding quantity and type of additive and dispersant on the magnetic layer may be applied.

The magnetic coating material prepared from the above materials is coated on the non-magnetic support member, and a magnetic layer is formed.

As the non-magnetic support member to be used in the present invention, the following compounds processed by biaxial stretching may be used: polyethylene naphthalate, polyethylene terephthalate, polyamide, polyimide, polyamideimide, aromatic polyamide, polybenzoxidazole. More preferably, polyethylene naphthalate or aromatic polyamide may be used. The non-magnetic support member may be processed in advance by corona discharge, plasma processing, adhesion processing, heat treatment, etc. It is preferable that the non-magnetic support member to be used in the present invention has such good smoothness that average surface roughness on centerline is 0.1 to 20 nm with cut-off value of 0.25 mm, or more preferably 1 to 10 nm. It is preferable in the non-magnetic support member that not only average surface roughness on centerline is small but there is no coarse protrusion of more than 1 $\mu$m.

To manufacture the magnetic recording medium of the present invention, a coating solution for the magnetic layer is coated, for example, on the surface of the non-magnetic support member under running condition. In this case, two or more types of the magnetic coating materials may be coated one after another or at the same time.

In case the magnetic recording medium has a single magnetic layer, the thickness of the coating film is preferably 0.05 to 5 $\mu$m, or more preferably 1 to 3 $\mu$m. In case there are two or more magnetic layers, the thickness of the uppermost magnetic layer is preferably 0.05 to 1.5 $\mu$m, or more preferably 0.07 to 1 $\mu$m. The thickness of the entire coating film is preferably 1.0 to 3.0 $\mu$m, or more preferably 1.5 to 2 $\mu$m.

As a coating means to coat the above magnetic coating material, air doctor coat, blade coat, rod coat, extrusion coat, air knife coat, squeeze coat, impregnation coat, reverse roll coat, transfer roll coat, gravure coat, kiss coat, cast coat, spray coat, spin coat, etc. may be used.

For the coating technique, reference may be made, for example, to: "The Latest Coating Technique" published by Sogo Gijutsu Center, Ltd. (May 31, 1983).

In case the present invention is applied to a magnetic recording medium having two or more layers, the following may be proposed as the devices and methods for the coating:

(1) By a coating device such as gravure, roll, blade, extrusion, etc. generally applied in the coating of a magnetic coating material, the lower layer is coated at first. While the lower layer is not yet completely dried, the upper layer is coated by a support member pressurizing type extrusion coating device as disclosed in JP-B-1-46186, JP-A-60-238179, JP-A-2-265672, etc.

(2) The upper and the lower layers are coated almost at the same time using a coating head having two slits to pass the coating solution, as disclosed in JP-A-63-88080, JP-A-2-17971, or JP-A-2-265672.

(3) The upper and the lower layers are coated at the same time by an extrusion coating device having a back-up roll as disclosed in JP-A-2-174965.

On the surface of the non-magnetic support member of the present invention where magnetic coating material is not coated, a back-coat (backing layer) may be provided. The back-coat layer is a layer, which is produced by coating a back-coat layer forming coating material (produced by dispersing granular component such as abrasive material, antistatic agent, etc. and a binder in an organic solvent) on a surface of the non-magnetic support member where the magnetic coating material is not coated. As the granular component, various types of inorganic pigment or carbon black may be used. As the binder, nitrocellulose, resin such as phenoxy resin, vinyl chloride resin, polyurethane, etc. may be used alone or by mixing.

An adhesive layer may be provided on the surface of the non-magnetic support member where the magnetic coating material and the back-coat forming coating material are coated.

The coating layer coated with the magnetic coating material is dried after magnetic field orientation processing has been performed on the ferromagnetic powder contained in the coating layer of the magnetic coating material.

After being dried, the coating layer is processed by surface smoothening process. For the surface smoothening process, a super-calender roll is used, for example. By the surface smoothening process, empty bores generated by removal of the solvent when drying are eliminated, and filling ratio of the ferromagnetic powder in the magnetic layer is increased. This provides a magnetic recording medium having higher electromagnetic transfer characteristics.

As the calender processing roll, a heat-resistant plastic roll such as epoxy, polyimide, polyamide, polyamideimide, etc. may be used. Also, a metal roll may be used.

The magnetic recording medium of the present invention has preferably the surface with such good smoothness that average surface roughness on centerline is 0.1 to 4 nm, or more preferably 1 to 3 nm with cut-off value of 0.25 mm. For this purpose, the magnetic layer formed by selecting a specific type of ferromagnetic powder and a binder as described above is processed by calender processing. In the calender processing conditions, the temperature of calender roll is preferably set within the range of 60 to 100° C., or more preferably 70 to 100° C., or most preferably 80 to 100° C. The pressure is preferably within the range of 100 to 500 kg/cm, or more preferably 200 to 450 kg/cm, or most preferably 300 to 400 kg/cm.

The magnetic recording medium thus obtained can be used by cutting to a desired size using a cutter.

Compared with the polyurethane resin generally in use, the polyurethane resin (A) of the present invention has lower polyol content and higher content of short-chain diol components. Therefore, compared with the conventional type polyurethane resin, it contains more quantity of hard segments. As a result, it is possible to provide high strength and high Tg value. In particular, it has excellent characteristics in repeated running at high temperature conditions. Further, because it contains ether group by 1 to 5 mmol/g, adsorption to the magnetic substance is improved. Thus, higher dispersion is obtained and electromagnetic transfer characteristics are increased. If ether group is contained by less than 1 mmol/g, adsorption to the magnetic substance decreases. Because ether group is hydrophilic, if it is contained by more than 5 mmol/g, solubility in solvent decreases, thus leading to lower dispersion property. Compared with the conventional type polyurethane, the polyurethane of the present invention uses short-chain diol having cyclic structure such as aromatic or cycloaliphatic compound, and coating film strength can be improved, in particular at high temperature condition, and durability such as elimination of head contamination is improved. However, in this type of polyurethane, breaking extension decreases, and toughness of the coating film tends to decrease. In this type of coating film, durability decreases, e.g. the magnetic layer may fall off from the edge. To overcome this problem, a polymer having lower Tg value such as polyether of aliphatic type is simultaneously used. As a result, toughness is improved while Tg value decreases, thus leading to lower durability at high temperature. On the other hand, when it is tried to improve Tg value by increasing cyclic structure such as aromatic or cycloaliphatic compounds, solubility in solvent decreases. Thus, it is very difficult to have both high electrical property and high durability. In this respect, the present inventors have found that this problem can be solved by simultaneous use of the polyether polyester polyurethane resin. In the present invention, polyether segment of the polyurethane resin (B) is compatible only with the polyether segment of the polyurethane resin (A). Accordingly, it is possible to increase breaking extension around the polyether segment while maintaining high dynamic strength of the polyurethane resin (A). As a result, the coating film becomes more tough, and this seems to contribute to extensive improvement in durability. By increasing toughness, workability of the coating film in the calender process is also improved, and it is possible to obtain coating film with higher smoothness and to improve electromagnetic transfer characteristics. Further, as unexpected effect, flexibility of the entire tape is improved because high breaking extension is provided. This results in elimination of cupping, and decreases wrinkles in the wind-up process, contributes to stabilization of the process, provides better contact of the tape on the head, and further improves electromagnetic transfer characteristics.

EXAMPLES

In the following, detailed description will be given on the present invention referring to several examples. In the description given below, the term "part(s)" means "weight part(s)", and the symbol "%" means "weight %".

Synthesis Examples of the Polyurethane Resin
Synthesis examples of the polyurethane resin A-1
In a container equipped with reflux condenser and stirrer and with the air inside replaced with nitrogen in advance, monomers as shown in Table 1 and dimethyl ester sulfo-isophthalate (DEIS) were dissolved in a mixed solvent containing cyclohexanone and dimethylacetamide in weight ratio of 50:50, and this was dissolved at 60° C. under nitrogen stream. Next, di-n-dibutyl tin dilaurate was added as catalyst by 60 ppm to total weight of the raw material and was dissolved. Further, MDI as given in Table 1 was added, and heating reaction was performed at 90° C. for 6 hours, and a polyurethane resin solution was obtained.
Synthesis examples of polyurethane resins A-1 to A-8 and B-1 to B-4
Synthesis was performed by the same procedure as in the above polyurethane resin A-1 except that polyol, diol, DEIS and MDI of the polyurethane were replaced by the compounds shown in Table 1. Molecular weight, ether group content and Tg value of each of the polyurethane resins thus prepared are given in Table 2.
The polyurethane resins A-1 to A-8 belong to the polyurethane resin (A), and the polyurethane resins B-1 to B-4 belong to the polyurethane resin (B).

Example 1

Using an open kneader, 100 parts of ferromagnetic alloy powder (composition: Fe 92%, Zn 4%, Ni 4%; Hc 2000 e; crystallite size 15 nm; BET specific surface area 59 m²/g; longer axis diameter 0.12 μm; acicular ratio 7; σ s 140 emu/g) were pulverized for 10 minutes. Next, 5 parts (solid components) of polyurethane resin A-1, 5 parts (solid components) of polyurethane resin B-1 and 60 parts of cyclohexanone were kneaded for 60 minutes. Then, the following compounds were added and this was dispersed for 120 minutes using a sand mill:

| | |
|---|---|
| Abrasive (Al$_2$O$_3$) (particle size 0.3 μm) | 2 parts |
| Carbon black (particle size 40 nm) | 2 parts |
| Methylethylketone/toluene (1/1) | 200 parts |

To this, the following compounds were added:

| | |
|---|---|
| Polyisocyanate | 5 parts (solid matters) |
| (Coronate 3041; Nippon Polyurethane Co., Ltd.) | |
| Butyl stearate | 2 parts |
| Stearic acid | 1 part |
| Methylethylketone | 50 parts |

This was further stirred up and mixed for 20 minutes and was then filtered through a filter with average pore size of 1 μm, and a magnetic layer coating solution for the upper layer was prepared.

Next, 85 parts of titanium oxide (average particle size 0.035 μm; crystal type rutile; TiO$_2$ content 90% or more; Surface treatment layer: alumina; S$_{BET}$ 35–42 m²/g; true specific gravity 4.1; pH 6.5–8.0) were pulverized for 10 minutes using an open kneader. Then, 5 parts (solid components) of the polyurethane resin A-1, 5 parts of the polyurethane resin B-1 (solid components), and 60 parts of cyclohexanone were kneaded for 60 minutes. Next, the following compound was added:

| | |
|---|---|
| Methylethylketone/cyclohexanone (6/4) | 200 parts | and this was dispersed for 120 minutes using a sand mill. To this, the following compounds were added:

| | |
|---|---|
| Butyl stearate | 2 parts |
| Stearic acid | 1 part |
| Methylethylketone | 50 parts |

After stirring and mixing this further for 20 minutes, this was filtered through a filter with average pore size of 1 μm, and a non-magnetic layer coating solution for the lower layer was prepared.

Next, on the surface of a polyethylene naphthalate support member of 10 μm in thickness, polyester resin containing sulfonic acid was coated as an adhesive layer to have the thickness of 0.1 μm when dried, using a coil bar. Then, the non-magnetic layer coating solution prepared above was coated in thickness of 2.0 μm, and immediately thereafter, the magnetic layer coating solution for the upper layer was coated to have thickness of 0.1 μm when dried, using a reverse roll. On the non-magnetic support member where the magnetic layer was coated, magnetic field orientation was performed using a magnet of 3000 gauss when the magnetic layer coating solution was not yet dried. Further, after drying, calender processing was performed (speed 100 m/min.; linear pressure 300 kg/cm; temperature 90° C.) with a combination of metal roll - metal roll - metal roll - metal roll - metal roll - metal roll - metal roll, and the product thus obtained was cut to have a width of 8 mm.

Examples 2–6 and Comparative Examples 1–8

In the above procedure, the polyurethane resins A-1 and B-1 were replaced by the polyurethane resin shown in Table 2, and a magnetic recording medium was prepared.

Example 7

As a magnetic layer coating solution for the upper layer, the magnetic layer coating solution of Example 1 was used.

A non-magnetic layer coating solution for the lower layer was prepared as follows:

Using an open kneader, 85 parts of $\alpha$-$Fe_2O_3$ (average particle size 0.15 $\mu$m; $S_{BET}$ 52 m$^2$/g; surface treatment $Al_2O_3$, $SiO_2$; pH 6.5–8.0) were pulverized for 10 minutes. Then, 7.5 parts of a compound obtained by adding hydroxyethyl sulfonate sodium salt to copolymer of vinyl chloride/vinyl acetate/glycidyl methacrylate (86/9/5) ($SO_3Na$=6× $10^{-5}$ eq/g; epoxy=$10^{-3}$ eq/g; Mw 30,000), 10 parts (solid components) of sulfonic acid-containing polyurethane resin (UR 8200; Toyobo Co., Ltd.), and 60 parts of cyclohexanone were kneaded for 60 minutes. Then, the following compound was added:

| | |
|---|---|
| Methylethylketone/cyclohexanone (6/4) | 200 parts | and this was dispersed for 120 minutes using a sand mill. To this, the following compounds were added:

| | |
|---|---|
| Butyl stearate | 2 parts |
| Stearic acid | 1 part |
| Methylethylketone | 50 parts |

After stirring and mixing this further for 20 minutes, this was filtered through a filter with average pore size of 1 $\mu$m, and a non-magnetic layer coating solution for the lower layer was prepared.

Next, on the surface of a polyethylene naphthalate support member of 10 $\mu$m in thickness, polyester resin containing sulfonic acid was coated as an adhesive layer to have the thickness of 0.1 $\mu$m when dried, using a coil bar. Then, the non-magnetic layer coating solution prepared above was coated in thickness of 2.0 $\mu$m, and immediately thereafter, the magnetic coating material was coated to have thickness of 0.1 $\mu$m when dried, using a reverse roll. On the non-magnetic support member where the magnetic coating material was coated, magnetic field orientation was performed using a magnet of 3000 gauss when the magnetic coating material was not yet dried. Further, after drying, calender processing was performed (speed 100 m/min.; linear pressure 300 kg/cm; temperature 90° C.) with a combination of metal roll - metal roll - metal roll - metal roll - metal roll - metal roll - metal roll, and the product thus obtained was cut to have a width of 8 mm.

Example 8

The same procedure as in Example 1 was performed except that the polyurethane resin in the magnetic layer coating solution for the upper layer was replaced by sulfonic acid-containing polyurethane (UR 8200; Toyobo Co., Ltd.).

TABLE 1

| Polyurethane | Polyol (wt %) | | | | Short-chain diol (wt %) | | | DEIS (wt %) | MDI (wt %) | Ether content (mmol/g) | Weight average molecular weight | Tg (° C.) Low temp. range | Tg (° C.) High temp. range |
|---|---|---|---|---|---|---|---|---|---|---|---|---|---|
| A-1 | BpA-PO(1) | 50 | | | HBpA | 15 | | 2 | 33 | 5 | 51000 | | |
| A-2 | ↓ | 10 | PCL500 | 40 | ↓ | 15 | | ↓ | 33 | 1 | 48000 | | |
| A-3 | ↓ | 0 | | | ↓ | 50 | PPG300 30 | ↓ | 18 | 5 | 47000 | | |
| A-4 | ↓ | 0 | | | ↓ | 50 | ↓ 6 | ↓ | 43 | 1 | 51000 | | |
| A-5 | BpA-PO(2) | 40 | | | ↓ | 20 | | ↓ | 38 | 4.8 | 45000 | | |
| A-6 | BpA-PO(1) | 50 | PPG600 | 5 | ↓ | 15 | | ↓ | 28 | 5.8 | 44000 | | |
| A-7 | BpA-PO(1) | 5 | | | ↓ | 50 | | ↓ | 43 | 0.6 | 50500 | | |
| A-8 | BpA-PO(1) | 53 | | | ↓ | 15 | | ↓ | 30 | 5.3 | 51000 | | |
| B-1 | Polyether(1) | 23 | Polyether(1) | 23 | None | None | | 7 | 47 | | 50000 | -74 | 58 |
| B-2 | ↓ | 23 | Polyether(2) | 23 | None | None | | ↓ | 47 | | 46500 | 10 | 55 |
| B-3 | ↓ | 46 | | | None | None | | ↓ | 47 | | 48000 | None | 55 |
| B-4 | | | Polyether(1) | 46 | None | None | | ↓ | 47 | | 49000 | -46 | None |

In the above table, symbols and abbreviations used are as follows:

BpA-PO (1): Propylene oxide addition product of bisphenol A (molecular weight 600)

BpA-PO (2): Propylene oxide addition product of bisphenol A (molecular weight 1000)

PCL500: Polycaprolactone polyol (molecular weight 500)

PPG600: Polypropylene glycol (molecular weight 600)

PPG300: Polypropylene glycol (molecular weight 300)

Polyester 1: Isophthalic acid/neopentyl glycol/ethylene glycol (mol ratio: 5/5/1)

Polyether 1: Polypropylene glycol (molecular weight 2000)

Polyether 2: Bisphenol A ethylene oxide addition product/ polytetramethylene glycol (mol ratio: 1/3)

HBpA: Hydrogenated bisphenol A (molecular weight 240)

DEIS: Ethylene oxide addition product of sulfophthalic acid (molecular weight 356)

MDI: Methanediphenyl isocyanate

On the magnetic recording media of Examples and Comparative Examples obtained above, properties were determined by the measuring methods given below. The results of the measurement are shown in Table 2.

Measuring Methods (1) Electromagnetic transfer characteristics

Using VTR (TR705; Sony Corporation), a signal of 7 MHz was recorded on a specimen tape and this was reproduced. Reproduction output of 7 MHz recorded on the specimen tape of Comparative Example 1 was defined as 0 dB, and relative reproduction output was measured.

(2) Ra

By light interference method using digital optical profimeter (manufactured by WYKO), average surface roughness on centerline under the condition of cut-off of 0.25 mm was measured as Ra.

(3) Still durability

Under the environmental condition of 40° C. and 80% relative humidity, the VTR in (1) above was used under still condition, and the duration until the reproduction output is turned to 30% of the recorded signal (still endurance time) was determined.

(4) Repeated running property

Using the VTR in (1) above, a 60-minute-length tape was continuously and repeatedly run by 1,000 times under the condition of 40° C. and 80% relative humidity. Contamination on video head was observed, damage of tape edge after running was checked, and it was examined how far the magnetic layer fell off.

When no contamination was found on video head by visual inspection, it was defined as "excellent", and when contamination was found by visual inspection, it was defined as "no good".

(5) Surface hardness of coating film

Under the condition of 40° C. and 80% relative humidity, load was applied up to 0.2 g at a rate of 5 mg/sec. using dynamic micro-hardness meter (DUH-50; Shimadzu Corporation), and hardness was determined from indenter depth and indenter sharpness (angle) when a load of 0.2 g was applied. The result is given in the unit of $mg/\mu m^2$.

(6) Cupping

A tape of 40 cm in length was left to stand under the condition of 23° C. and 50% relative humidity, and it was checked by visual inspection. When it was rounded on the magnetic layer side, it was defined as "cupping present".

(7) Breaking extension of the magnetic layer

Both ends of a specimen tape having a length of 100 mm was stretched by pulling rate of 0.1 mm/min. The surface of the magnetic layer was examined under microscope by magnification of 400 x, and when 5 or more crackings were found on the surface of the magnetic layer, elongation was determined.

TABLE 2

| | Polyurethane (A) | | | | Polyurethane (B) | | | | Electromag. transfer charac. (dB) | Magnetic layer breaking extension (%) |
|---|---|---|---|---|---|---|---|---|---|---|
| | Resin type | Polyol (wt %) | Diol (wt %) | Ether content (wt %) | Resin type | Tg1 (° C.) | Tg2 (° C.) | Ra (nm) | | |
| Example 1 | A-1 | 50 | 15 | 5 | B-1 | −74 | 58 | 2 | 1.2 | 3.1 |
| Example 2 | A-2 | 10 | 15 | 1 | ↓ | ↓ | ↓ | 2.1 | 0.7 | 2.2 |
| Example 3 | A-3 | 0 | 50 | 5 | ↓ | ↓ | ↓ | 2 | 0.8 | 3.5 |
| Example 4 | A-4 | 0 | 50 | 1 | ↓ | ↓ | ↓ | 2 | 0.8 | 2.4 |
| Example 5 | A-5 | 40 | 20 | 4.8 | ↓ | ↓ | ↓ | 2.1 | 1 | 3.8 |
| Example 6 | A-1 | 50 | 15 | 5 | ↓ | ↓ | ↓ | 2.2 | 0.8 | 3.6 |
| Example 7 | A-1 | 50 | 15 | 5 | ↓ | ↓ | ↓ | 2.3 | 0.7 | 3.7 |
| Example 8 | A-1 | 50 | 15 | 5 | ↓ | ↓ | ↓ | 1.9 | 1.1 | 3.6 |
| Comparative Example 1 | A-6 | 50 | 15 | 5.8 | B-2 | 10 | 55 | 2.6 | 0 | 0.5 |
| Comparative Example 2 | A-7 | 5 | 50 | 0.5 | B-1 | −74 | 58 | 2.7 | 0 | 0.7 |
| Comparative Example 3 | A-8 | 53 | 15 | 5.3 | ↓ | ↓ | ↓ | 2.7 | −0.1 | 0.8 |
| Comparative Example 4 | A-1 | 50 | 15 | 5 | B-3 | | 55 | 2.8 | −0.2 | 0.5 |
| Comparative Example 5 | A-1 | 50 | 15 | 5 | B-4 | −46 | | 2.4 | 0 | 0.6 |
| Comparative Example 6 | A-1 | 50 | 15 | 5 | None | | | 2.3 | 0.5 | 0.7 |
| Comparative Example 7 | A-1 | 50 | 15 | 5 | B-3 B-4 | −46 | 55 | 2.7 | 0.1 | 0.8 |
| Comparative Example 8 | None | | | | B-1 | −74 | 58 | 2.6 | 0.2 | 0.4 |

| | Surface hardness | Still durability (min.) | Edge damage | Contamination | Cupping |
|---|---|---|---|---|---|
| Example 1 | 26 | 90 or more | None | Excellent | None |
| Example 2 | 25 | 90 or more | None | Excellent | None |
| Example 3 | 31 | 90 or more | None | Excellent | None |
| Example 4 | 29 | 90 or more | None | Excellent | None |
| Example 5 | 24 | 90 or more | None | Excellent | None |
| Example 6 | 26 | 90 or more | None | Excellent | None |
| Example 7 | 27 | 90 or more | None | Excellent | None |
| Example 8 | 27 | 90 or more | None | Excellent | None |
| Comparative Example 1 | 13 | 45 | Present | No good | Present |
| Comparative Example 2 | 8 | 50 | Present | No good | Present |

TABLE 2-continued

| | | | | | |
|---|---|---|---|---|---|
| Comparative Example 3 | 10 | 43 | Present | No good | Present |
| Comparative Example 4 | 12 | 38 | Present | No good | Present |
| Comparative Example 5 | 13 | 57 | Present | No good | Present |
| Comparative Example 6 | 22 | 58 | Present | No good | Present |
| Comparative Example 7 | 18 | 55 | Present | No good | Present |
| Comparative Example 8 | 10 | 44 | Present | No good | Present |

In the magnetic recording medium of the present invention, dispersion property of the magnetic layer is increased, and electromagnetic transfer characteristics are improved. Breaking extension is improved and coating film strength at high temperature is high. In particular, improvement is noted in still durability at high temperature condition and head contamination and tape damage under repeated running condition. Further, as unexpected effect, cupping of the tape is eliminated.

What we claim are:

1. A magnetic recording medium, comprising a magnetic layer having at least one layer of ferromagnetic powder and a binder, said magnetic layer being placed on a non-magnetic support member, whereby said binder consists essentially of a polyurethane resin (A) and a polyether polyester urethane resin (B), said polyurethane resin (A) contains units derived from a short-chain diol with a molecular weight of 200 to 500 in an amount of 15 to 50 weight %, said short-chain diol having a cyclic structure, said polyurethane resin (A) also contains units derived from a polyol with molecular weight of 500 to 5000 in an amount of 0 to 50 weight %, said polyol being obtained by adding alkylene oxide of a diol having a cyclic structure, and said polyurethane resin (A) contains ether groups obtained from said diol and said polyol in an amount of 1.0 to 5.0 mmol/g to the total quantity of the polyurethane resin (A).

2. A magnetic recording medium, comprising a lower layer having a non-magnetic powder or a ferromagnetic powder and a binder, said lower layer being placed on a non-magnetic support member, and an upper layer having a ferromagnetic powder and a binder, said upper layer being placed on said lower layer, whereby said binder in said upper layer and/or said lower layer consists essentially of a polyurethane resin (A) and a polyether polyester urethane resin (B), said polyurethane resin (A) contains units derived from a short-chain diol with a molecular weight of 200 to 500 in an amount of 15 to 50 weight %, said short-chain diol having a cyclic structure, said polyurethane resin (A) also contains units derived from a polyol with molecular weight of 500 to 5000 in an amount of 0 to 50 weight %, said polyol being obtained by adding alkylene oxide of a diol having a cyclic structure, and said polyurethane resin (A) contains ether groups obtained from said diol and said polyol in an amount of 1.0 to 5.0 mmol/g to the total quantity of the polyurethane resin (A).

3. A magnetic recording medium according to claims 1 or 2, wherein a diol selected from the following compounds is said diol having a cyclic structure:

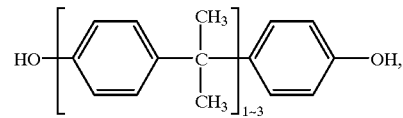

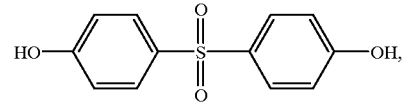

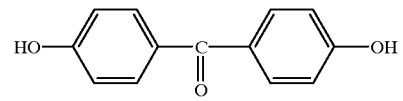

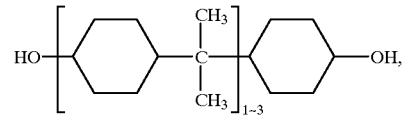

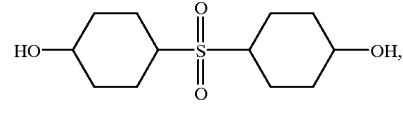

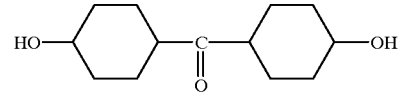

4. A magnetic recording medium according to claims 1 or 2, wherein said polyether polyester urethane resin (B) has a glass transition temperature (Tg) in the range from −85° C. to 0° C. and in the range from 40° C. to 200° C.

* * * * *